(12) United States Patent
Okamoto

(10) Patent No.: US 7,008,013 B2
(45) Date of Patent: Mar. 7, 2006

(54) STRUCTURE FOR SECURING CUP SUPPORT ELEMENT IN AUTOMOTIVE SEAT

(75) Inventor: Hikonori Okamoto, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/706,928

(22) Filed: Nov. 14, 2003

(65) Prior Publication Data

US 2005/0104422 A1 May 19, 2005

(51) Int. Cl.
*A47C 7/62* (2006.01)
*B60N 3/10* (2006.01)

(52) U.S. Cl. .............................. 297/188.11; 297/188.13

(58) Field of Classification Search ............ 248/311.2, 248/300, 200; 297/188.17, 188.13, 188.08, 297/188.11
See application file for complete search history.

(56) References Cited

U.S. PATENT DOCUMENTS

| | | | | |
|---|---|---|---|---|
| 3,623,683 A | * | 11/1971 | Bennett ................... | 244/122 A |
| 5,520,436 A | * | 5/1996 | Rader et al. ........... | 297/188.11 |
| 5,586,806 A | * | 12/1996 | Hergott ................. | 297/188.11 |
| 5,749,554 A | * | 5/1998 | Avila et al. .............. | 248/311.2 |

FOREIGN PATENT DOCUMENTS

| JP | 09309370 A | * | 12/1997 |
|---|---|---|---|
| JP | 2000-190783 A | | 11/2000 |

* cited by examiner

*Primary Examiner*—Rodney B. White
*Assistant Examiner*—Joe Edell
(74) *Attorney, Agent, or Firm*—Browdy and Neimark, PLLC

(57) ABSTRACT

A structure for securing a cup support element in a seat cushion of automotive seat, the cup support element being of the type comprising a body portion and a slide support member slidably inserted in the body portion for supportively receiving drinking cups or the like. A protection plate having securing pieces of a rigid yet elastic property is provided in such structure, and the cup support element is connected via the protection plate with a known wire frame assembly provided in the seat cushion, such that the securing pieces of the protection plate are connected with the known wire frame assembly, thereby allowing those particular securing pieces to be bendable by a downward load applied to the seat cushion and thus protecting the cup support element as well as the protection plate itself against deformation.

16 Claims, 3 Drawing Sheets

STRUCTURE FOR SECURING CUP SUPPORT ELEMENT IN AUTOMOTIVE SEAT

BACKGROUND OF THE INVENTION

1. Field of the Invention

The present invention relates to a cup holder or cup support element provided in an automotive seat, which is adapted for supportingly receiving cups including drinking cups, glasses or vessels. In particular, the invention is directed to a structure for securing such cup support element in the automotive seat.

2. Description of the Prior Art

Normally, it has been taken for granted that a cup holder or a cup support element for supportively receiving cups or the like is provided in an armrest equipped in the seat back of a rear seat of bench type in an automobile.

However, it is has been found frequently that such armrest of rear seat has a built-in remote controller or the like for operating a slide device, a reclining device, or an air ventilation device associated with the rear seat, which occupies most of inner space in the armrest and does not give any remaining space for the cup support element to be accommodated therein. In that case, there is no choice but to arrange the cup support element in the seat cushion of the rear seat.

When it comes to mounting the cup holder or cup support element in that seat cushion, the following problems raise: (i) Since most of the seat cushion of rear seat has a relatively intricate wire framework provided therein, which is much larger than that of the armrest, it is extremely difficult to determine a precise position of the cup support element in such wire framework and incorporate the drinking cup holder therein at a desired point, and (ii) even if the cup support element is incorporated in the wire framework of rear-seat seat cushion, a great load (a weight of passenger or cargo) applied to the seat cushion will deform the wire framework to the extent that a body of the cup support element will be correspondingly deformed, thus making it difficult to draw and withdraw the cup support element itself from and into the seat cushion.

SUMMARY OF THE INVENTION

In view of the above-stated drawbacks, it is therefore a primary purpose of the present invention to provide an improved structure for securing a cup support element in a seat back of vehicle seat, the cup support element including a body portion and a slide support member slidably supported in the body portion, which prevents deformation of the cup support element to allow smooth movement of the slide support member from and into the body portion.

In order to achieve such purpose, in accordance with the present invention, the structure for securing a cup support element in the seat back of vehicle seat is comprised of:
a wire frame means provided in the seat cushion; and
a protection plate fixedly attached to the body portion of the cup support element so as to embracingly cover the particular body portion, the protection plate means having a plurality of securing pieces projected therefrom;
the securing pieces of protection plate means being of a rigid yet bendable property and being securely connected with the wire framework mans, thereby securing the cup support element in the seat cushion.

Accordingly, when a downward load, such as a weight of passenger sitting on the seat, is applied to the seat cushion, the wire frame means and the securing pieces of protection plate means are resiliently bent downwardly, thereby absorbing most of the downward load and preventing the load from being directly imparted to the relatively fragile cup support element, thereby insuring to retain a shape of the drinking cup holder and allow smooth movement of the slide support member in a body portion of the cup support element, so that a user can draw and withdraw the slide support member from and into the body portion even when the load has been exerted upon the cup support element.

Preferably, the protection plate may be formed from a rigid metallic material and has a reinforcing bead formed thereon, and the plurality of securing pieces be integrally provided with each of the lateral walls of the protection plate in such a manner as to project horizontally and outwardly therefrom.

Preferably, the wire frame means may comprise: a wire frame assembly having a configuration that substantially constitutes a contour of the seat cushion; and a wire sub-assembly formed integrally in the wire frame assembly, and it may be so arranged that the wire sub-assembly is disposed in a foam padding and the securing pieces of protection plate are securely connected with the wire sub-assembly.

Other various features and advantages will become apparent from reading of description hereinafter, with reference to the drawings.

DETAILED DESCRIPTION OF PREFERRED EMBODIMENT OF THE INVENTION

Referring to FIGS. 1 to 4, there is illustrated one preferred mode of a structure for securing a cup holder or cup support element in an automotive seat in accordance with the present invention. As is well known, the cup holder or cup support element itself is designed to supportingly receive drinking cups, glasses, vessels or the like.

Figure 1:
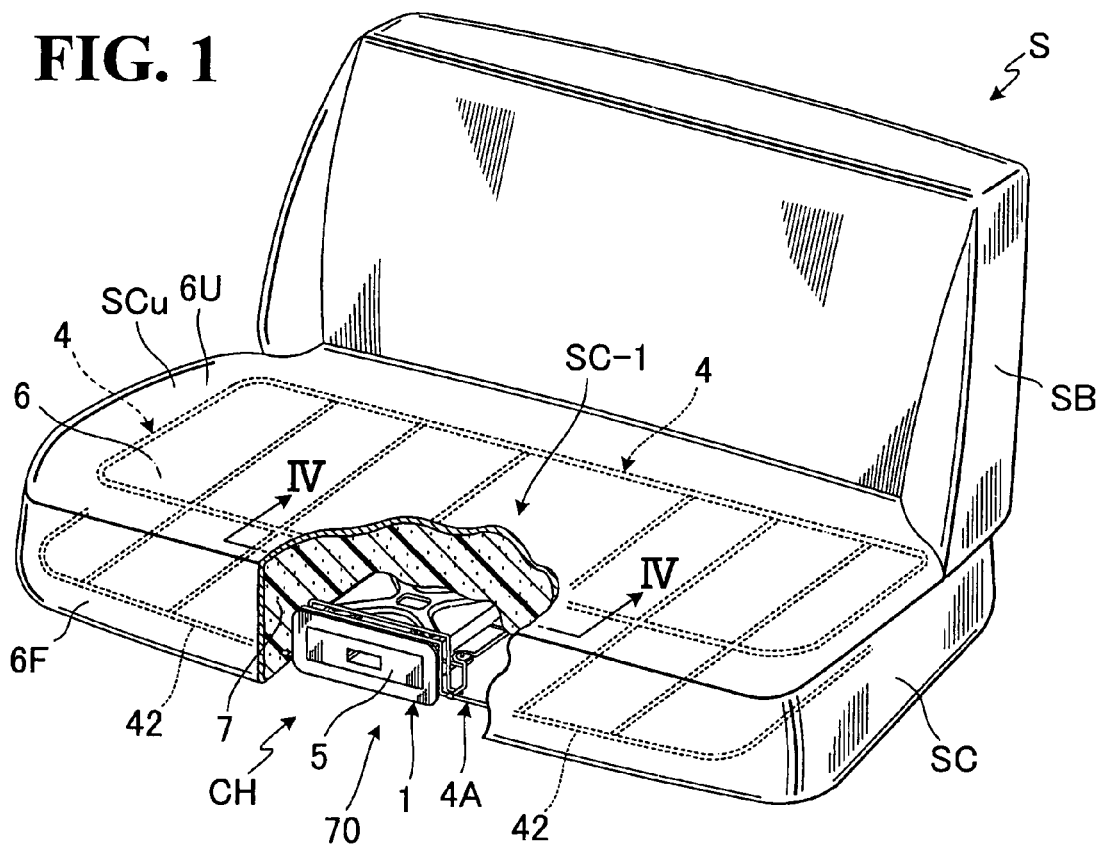
FIG. 1 is a partly broken schematic perspective view of an automotive rear seat in which a cup support element structure of the present invention is provided.

Specifically, FIG. 1 illustrates an automotive seat or a rear seat (S) of bench seat type for use in an automobile, which allows two or three passengers to sit thereon, the rear seat (S) typically comprising a seat cushion (SC) and a seat back (SB). As indicated by the phantom lines in FIG. 1, the seat cushion (SC) is formed by the conventional way such that a wire frame assembly (4) is integrally provided in a foam padding (7) by a known foaming process for instance, and a trim cover assembly (6) is securely attached on the foam padding (7). The wire frame assembly (4) is formed by a plurality of wire materials in a three-dimensional way as indicated by the phantom lines, which is however well known in the art.

Designation (CH) generally represents a novel structure for securing a cup holder or a cup support element in the foregoing rear seat (S). According thereto, in brief, as shown in FIG. 1, a slide-out cup support element (1) is provided in the seat cushion (SC) at a point centrally and forwardly of the seat cushion, with such an arrangement that a local seat cushion structure (SC-1) is defined therein, which comprises: a wire sub-assembly (4A) formed in the afore-stated wire frame assembly (4); and a space (70) formed in the afore-stated foam padding (7), so as to supportively accommodate the cup support element (1) therein, and that a protection plate (4) is interposed between the wire sub-assembly (4A) and the cup support element (1).

Figure 2:
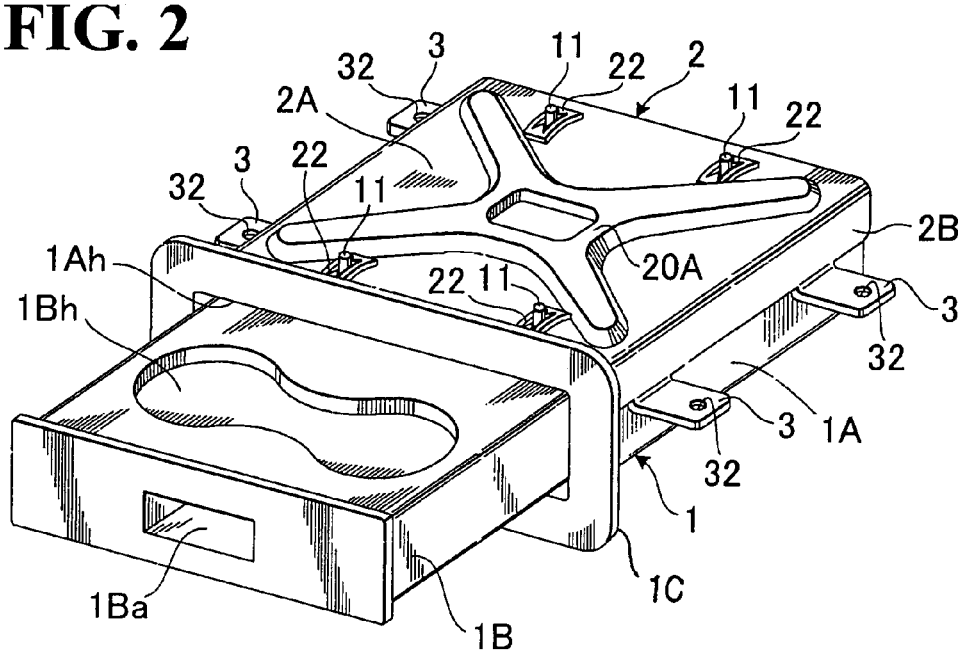
FIG. 2 is a schematic perspective view of a cup support element used in the structure of the present invention.
Figure 3:
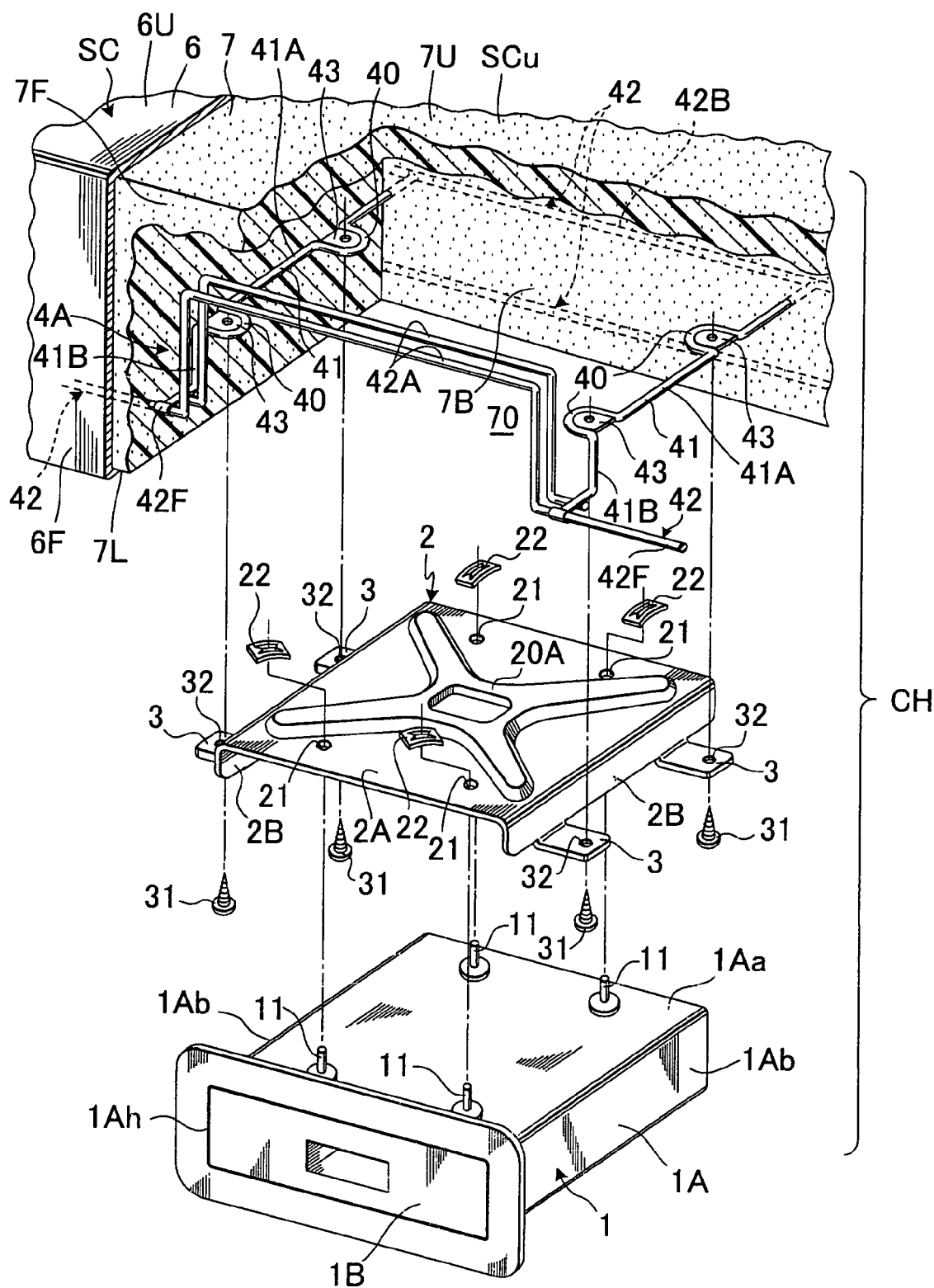
FIG. 3 is a partly broken exploded perspective view showing a whole principal part of the present invention.

Now, a specific description of the structure (CH) will be described. As shown in FIG. 2, the cup support element (1) itself is of a typically known type formed from a plastic material, which comprises a body portion (1A) and a slide support member (1B) slidably supported in the hole (1Ah) of the body portion (1A). The illustrated slide support member (1B) has, formed therein, a recessed region (1Bh) so configured to receive each of two drinking cups (not shown) or other similar containers. Designation (1Ba) denotes a recessed handle portion formed in the forward end area of the slide support member (1B), which allows fingers of a user to be inserted therein in order to facilitate drawing the slide support member (1B) forwardly as can be seen from FIG. 2. As shown in FIG. 3, the body portion (1A) of cup support element (1) is provided with four securing pins (11) on the upper wall (1Aa) thereof.

Designation (2) denotes a protection plate for protecting the foregoing cup support element (1) against a load applied thereto to thereby retain the shape of the cup holder (1). As best shown in FIG. 3, the protection plate (2) is formed from a rigid metallic material having a certain elastic property, such as a spring steel, in the illustrated configuration. Namely, the protection plate (2) is formed by: a horizontally expanding main portion (2A); a pair of vertical lateral portions (2B) extending downwardly form that main portion (2A); and a pair of horizontal securing pieces (3) integrally formed with an edge of each of the two vertical lateral portions (2B), such that all the four horizontal securing lugs (3) project horizontally and laterally of the protection plate (2) in an outward direction therefrom. A whole size of the protection plate (2) is generally equal to the outer contour of the body portion (1A) of cup support element (1), thereby allowing the former (2) to be attached on and over the upper half of the latter (1A).

As shown, the horizontally expanding main portion (2A) of the protection plate (2) is formed with a generally "X" shaped reinforcing bead (20A) and four securing holes (21). Each of the horizontal securing pieces (3) is formed with a securing hole (32) and elastically bendable in a vertical direction relative to a horizontal plane along which the horizontal main portion (2A) extends.

Figure 4:
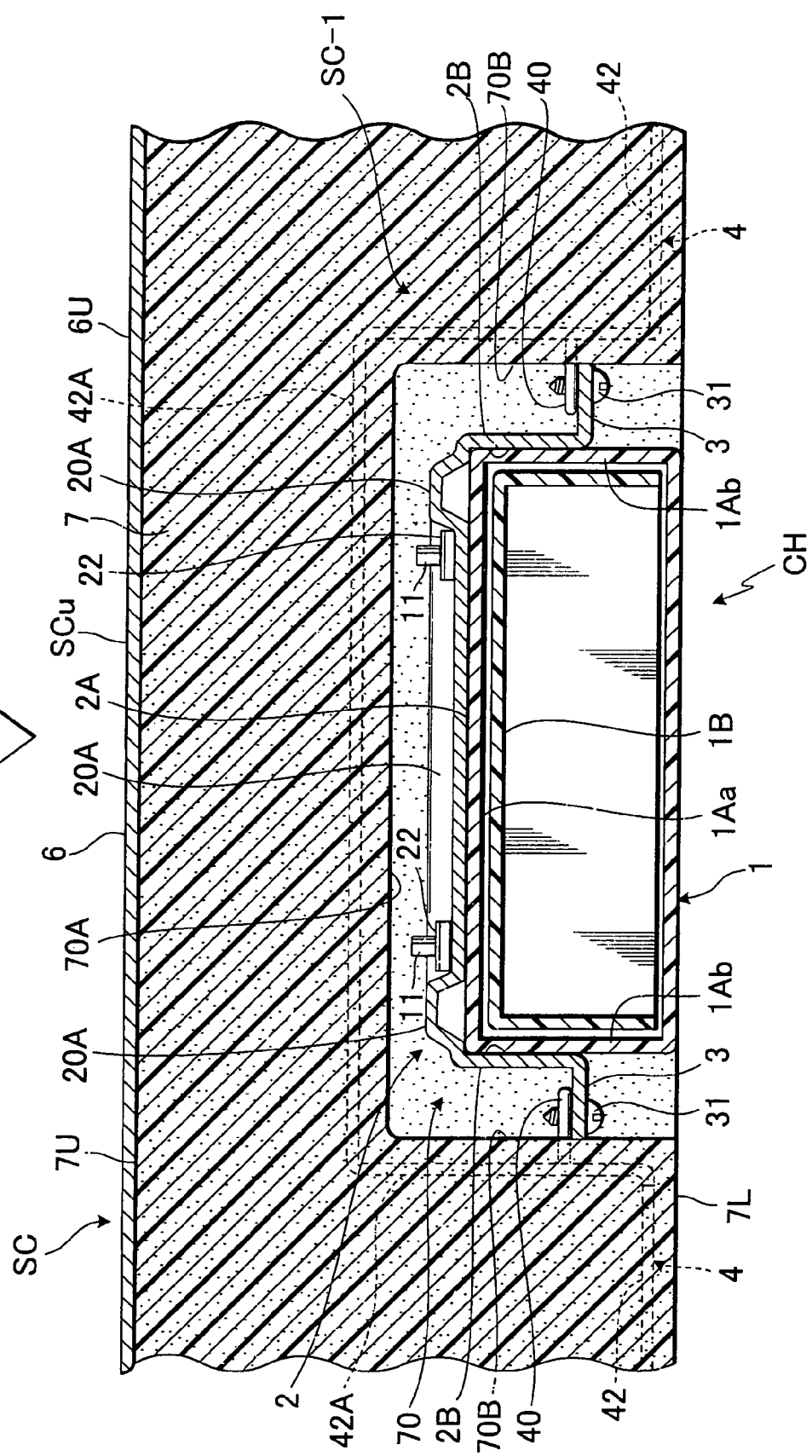
FIG. 4 is a sectional view taken along the line IV—IV in FIG. 1.

As seen from FIGS. 2 and 3, the protection plate (2) is securely attached on the upper side of the body portion (1A) of cup support element (1) by inserting the four securing pins (11) of that body portion (1A) through the respective four securing holes (21) of the protection plate (2) and then securely engaging four clip nuts (22) with the four securing pins (11), respectively. In that way, as can be seen in FIGS. 3 and 4, a whole of the protection plate (2) is firmly attached upon the upper half of the body portion (1A) of cup support element (1), such that the horizontally expanding main portion (2A) of the protection plate (2) is firmly mounted on the upper wall (1Aa) of the cup support element body portion (1A), while the two vertical lateral portions (2B) of the protection plate (2) are contacted with the two vertical lateral walls (1Ab) of the cup support element body portion (1A), respectively. Hence, it can be best observed from FIG. 4 that the horizontal securing pieces (3) of protection plate (2) project horizontally from both two vertical lateral walls (1Ab) of cup support element body portion (1A).

On the other hand, as stated previously, in accordance with the structure (CH) of the present invention, the local seat cushion structure (SC-1) is provided in the seat cushion (SC). Namely, referring to FIGS. 3 and 4, the space (70), one element of the local seat cushion structure (SC-1), is formed in the foam padding (7) of the seat cushion (SC) by cutting away the corresponding area in the forward wall portion (7F) and bottom wall portion (7L) of the foam padding (7) at a point centrally of the seat cushion (SC) as understandable from FIG. 1. Hence, the bottom of seat cushion (SC) is opened at that point in order to allow the cup support element (1) to be mounted in such space (70) as will be described later. The wire sub-assembly (4A) forming one element of the local seat cushion structure (SC-1) is arranged in the foam padding (7) so as to surround the foregoing space (70). As best shown in FIG. 3, the wire sub-assembly (4A) comprises a pair of transverse wire members (42A) (42A) each being bent into a generally "inverted U" shape, and a pair of longitudinal wire members (41) (41).

As described earlier, the known three-dimensional intricate wire framework (4) is integrally embedded in the foam padding (7) of the seat cushion (SC), which includes a plurality of transverse wire elements (42) among other various wire elements constituting the wire framework (4), which can be generally seen from the phantom lines of FIG. 1.

In accordance with the present invention, such transverse wire elements (42) are used to form the wire sub-assembly (4A). Specifically, referring to FIG. 3, two transverse wire elements (42) (42) are shown as extending transversely in the foam padding (7) at a point adjacent to the forward end area of the seat back (SB). Integrally provided with a forwardly facing one (42F) of the transverse wire elements (42) are the pair of transverse wire members (42A) (42A) in such a manner as to protrude upwardly in a generally "inverted U" shape from a horizontal line along which the original transverse wire element (42) extends. On the other hand, a pair of longitudinal wire members (41) (41) are extended between the forwardly facing transverse wire element (42F) and another backwardly facing transverse wire element (42B), wherein both of those two transverse wire elements (42F) (42B) are associated with the known wire frame assembly (4). In this regard, as shown, the forwardly facing transverse wire element (42F) is located at a level lower than the backwardly facing transverse wire element (42B). Hence, each of the two longitudinal wire members (41) is so formed to have a horizontal wire section (41A) and a vertical wire section (41B). The horizontal wire section (41A) is fixedly connected with the backwardly facing transverse wire element (42B), whereas the vertical wire section (41B) is fixedly connected with the forwardly facing transverse wire element (42F), as shown. Further, integrally formed in the horizontal wire section (41A) are a pair of spaced-apart curvilineraly bent portions (40) each having a securing piece (43) integrally welded therein, wherein the securing piece (43) is formed with a threaded hole (not designated), as can be seen from FIG. 3, for a purpose to be set forth later.

It is noted here that the space (70) is formed by cutting away predetermined local regions of the forward and bottom walls (70F) (70L) of the foam padding (7) as well as a corresponding local region of the forward wall section (6F) of trim cover assembly (6), into such a cubic configuration having an upper horizontal wall (70A), a pair of lateral vertical walls (70B) (70B), and a backward vertical wall (7B). Thus, while not clearly shown, an opening is formed at a local area of forward lateral side of the seat cushion (SC) corresponding to the space (70).

As understandable from both FIGS. 3 and 4, all the above-described wire elements (42) of wire frame assembly (4) and the wire members (41, 41A, 41B and 42A) of wire sub-assembly (4A) are embedded in the foam padding (7) at a point adjacent to the upper and lateral walls (70A) (70B) of the space (70) formed in the foam padding (7). In particular, the wire sub-assembly (4A) is arranged in such a manner as to surround the upper horizontal and lateral vertical walls (70A) (70B) of space (70). Specifically stated, as can be best seen from FIG. 4 in conjunction with FIG. 3, the arrangement of the wire sub-assembly (4A) at that space (70) is such that the generally invented-U-shaped two transverse members (42A) extend within the foam padding (7) alongside of the upper horizontal wall (70A) facing to the upper side (SCu) of seat cushion (SC) as well as alongside of the two vertical walls (70B) (70B), and, though not clearly shown, the two longitudinal wire members (41) (41) extend within the foam padding (7) alongside of the respective two lateral vertical walls (70B) (70B). In this regard, it is observed that only the curvilinearly bent portions (40) as well as the securing pieces (43) project horizontally from the lateral vertical walls (70B) into the space (70).

Accordingly, the previously described cup support element (1) with the protection plate (2) securely attached thereon is inserted into the space (70) from the bottom (at 7L) of seat cushion (SC), so that the four securing holes (32) of securing lugs (3) are coaxially aligned with the corresponding four securing holes formed in the four securing pieces (43) of curvilinearly bent portions (40), respectively. It is observed here that the main portion (2A) of protection plate (2) faces to the upper side (SCu) of seat cushion (SC) on which a passenger is to sit. Then, as indicated in FIG. 3, each of four securing screws (31) is driven into each of the foregoing aligned securing holes, whereupon the cup support element (1) is securely mounted in position within the space (70) such that, although not clearly shown, the garnish flange portion (1C) of the cup support element (1) is attached on the forward lateral wall of the seat cushion (SC) (corresponding to the forward cover section (6F) of trim cover assembly (6)) at a region circumscribing the above-noted opening defined in the space (70).

With the above-described structure, it is appreciated that the following advantages are attained:

(i) As indicated in FIG. 4, when a downward load (F), such as a weight of passenger sitting on the seat (S), is applied to the seat cushion (SC), all the foam padding (7), wire frame assembly (4) and wire sub-assembly (4A) are deformed downwardly, but, simultaneous with such deformation, the four securing lugs (3) are resiliently bent downwardly, thereby absorbing most of the downward load (F) due to such elastic buffer actions of those particular securing lugs (3) and thus preventing the load from being directly imparted to the relatively fragile cup support element (1). Further, the protection plate (2) per se is provided with the reinforcing bead (20) and thereby not deformed by the load (F). Thus, the cup support element (1) is protected by the protection plate (2) against the downward load (F) and prevented from being deformed by the load (F), thereby insuring to retain a shape of the drinking cup holder (1) and allow smooth movement of the slide support member (1B) in a body portion (1A) of the cup support element (1), so that a user can draw and withdraw the slide support member (1B) from and into the body portion (1A) even when the load (F) has been exerted upon the cup support element (1).

(ii) The transverse and longitudinal wire members (42A) (41) are effectively used to easily and precisely define the space (7) at a desired point or a central point in bottom side of seat cushion (SC). Such two wire members (42A) (41) can be easily positioned and formed at a desired point in the conventional complicated wire frame assembly (4), as seen from FIG. 3 for instance, prior to a foaming process for creating a foam padding (7) integrally with the wire frame assembly (4). Therefore, the space (70) can easily be formed in such desired or central point in the resulting foam padding (7) of seat cushion (SC) in spite of the conventionally complicated structure of wire framework (4).

While having described the present invention so far, it should be understood that the invention is not limited to the illustrated embodiment, but any other modification, replacement and addition may be applied thereto without departing from the scopes of the appended claims.

What is claimed is:

1. A structure for securing a cup support element in a seat cushion of vehicle seat, in which said cup support element includes a body portion and a slide support member slidably supported in said body portion, said slide support member being designed to supportively receive drinking cups and glasses, comprising:

a wire frame embedded in foam padding of said seat cushion; and a substantially rigid protection plate having a plurality of securing pieces projecting horizontally and outwardly therefrom;

wherein said plurality of securing pieces are securely connected with said wire frame, wherein each of said plurality of securing pieces have a width less than that of said protection plate so that said plurality of securing pieces will bend with respect to the protection plate given a great force against said protection plate; and wherein said protection plate is fixedly attached to said body portion of said cup support element so as to embracingly cover said body portion, while being supportively connected with said wire framework via said plurality of securing pieces.

2. The structure as claimed in claim 1, wherein said protection plate is formed from a metallic material which has an elastic property which allows the protection plate to be resiliently deformable by a great load being applied thereto.

3. The structure as claimed in claim 1, wherein said protection plate has a pair of lateral walls, and wherein said plurality of securing pieces are integrally provided with each of said pair of lateral walls to project horizontally and outwardly therefrom.

4. The structure as claimed in claim 1, wherein said seat cushion has an upper side for a passenger to sit, wherein said body portion of said cup support element has an upper wall and a pair of lateral walls, wherein said protection plate is so formed to have a main horizontal portion and a pair of lateral portions extending vertically from said main horizontal portion, wherein said plurality of securing pieces are integral with each of said pair of lateral portions of said protection plates so as to project outwardly and horizontally therefrom in parallel with said main horizontal portion of the protection plate, wherein said protection plate is securely attached to said body portion of said cup support element, such that the main portion thereof covers the upper wall of said cup support element body portion, while the pair of laterals portions thereof respectively cover said pair of lateral walls of said cup support element body portion.

5. The structure as claimed in claim 1, wherein said seat cushion has a foam padding provided therein, wherein said wire frame is embedded integrally in said foam padding, wherein the structure further comprises a space defined in a predetermined region of said foam padding, and wherein, in said space, said plurality of securing pieces of said protection plate are securely connected with a portion of said wire frame.

6. A structure for securing a cup support element in a seat cushion of vehicle seat, in which said seat cushion has a foam padding provided therein and said cup support element includes a body portion and a slide support member slidably supported in said body portion, said slide support member being designed to supportively receive drinking cups and glasses, said structure comprising:
 a space defined in a predetermined region of said foam padding;
 a wire frame embedded integrally in said foam padding, said wire frame comprising:
 a wire frame assembly having a configuration that substantially constitutes a contour of said seat cushion; and
 a wire sub-assembly formed in said wire frame assembly and disposed in said foam padding at a point adjacent to said space; and
 a substantially rigid protection plate including a plurality of securing pieces projected horizontally and outwardly therefrom;
 wherein said plurality of securing pieces are securely connected with said wire sub-assembly in said space, and each has a width less than that of said protection plate so that said plurality of securing pieces will bend with respect to the protection plate given a great force against said protection plate; and
 wherein said protection plate is fixedly attached to said body portion of said cup support element so as to embracingly cover said body portion, while being supportively connected with said wire frame via said plurality of securing pieces.

7. The structure according to claim 6, wherein said seat cushion has an upper side on which a passenger is to sit; a lateral side vertically extending from said upper side; and a bottom side opposite to said upper side; wherein said foam padding has an upper wall corresponding to said upper side of said seat cushion; a lateral wall corresponding to said lateral side of said seat cushion; and a bottom wall corresponding to said bottom side of said seat cushion, and wherein said space if formed by cutting away part of said lateral and bottom walls of said foam padding.

8. The structure according to claim 6, wherein said wire sub-assembly includes at least two wire members connected with said wire frame assembly, and wherein said plurality of securing pieces of said protection plate are securely connected with said at least two wire members.

9. A structure for securing a cup support element in a seat cushion of vehicle seat, in which said cup support element includes a body portion and a slide support member slidably supported in said body portion, said slide support member being designed to supportively receive drinking cups and glasses, comprising:
 a wire frame embedded in foam padding of said seat cushion; and
 a substantially rigid protection plate having a pair of lateral walls projecting down from said projection plate and a plurality of securing pieces projecting horizontally and outwardly from a free edge of each of said pair of lateral walls;
 wherein said plurality of securing pieces are securely connected with said wire frame, wherein each of said plurality of securing pieces has an elastic property relative to said protection plate, thereby being resiliently bendable with respect to the protection plate; and
 wherein a bottom surface of said protection plate abuts and is fixed to a top surface of said body portion of said cup support element so as to embracingly cover said body portion, while being supportively connected with said wire framework via said plurality of securing pieces.

10. The structure as claimed in claim 9, wherein said protection plate is formed from a metallic material which has an elastic property which allows the protection plate to be resiliently deformable by a great load being applied thereto.

11. The structure as claimed in claim 9, wherein said plurality of securing pieces are integral with each of said pair of lateral walls.

12. The structure as claimed in claim 9, wherein said seat cushion has an upper side for a passenger to sit, wherein said body portion of said cup support element has an upper wall and a pair of lateral walls, wherein said protection plate is so formed to have a main horizontal portion and a pair of lateral portions extending vertically from said main horizontal portion, wherein said plurality of securing pieces are integral with each of said pair of lateral portions of said protection plates so as to project outwardly and horizontally therefrom in parallel with said main horizontal portion of the protection plate, wherein said protection plate is securely attached to said body portion of said cup support element, such that the main portion thereof covers the upper wall of said cup support element body portion, while the pair of laterals portions thereof respectively cover said pair of lateral walls of said cup support element body portion.

13. The structure as claimed in claim 9, wherein said seat cushion has a foam padding provided therein, wherein said wire frame is embedded integrally in said foam padding, wherein the structure further comprises a space defined in a predetermined region of said foam padding, and wherein, in said space, said plurality of securing pieces of said protection plate are securely connected with a portion of said wire frame.

14. A structure for securing a cup support element in a seat cushion of vehicle seat, in which said seat cushion has a foam padding provided therein and said cup support element includes a body portion and a slide support member slidably supported in said body portion, said slide support member being designed to supportively receive drinking cups and glasses, said structure comprising:
 a space defined in a predetermined region of said foam padding;
 a wire frame embedded integrally in said foam padding, said wire frame comprising:
 a wire frame assembly having a configuration that substantially constitutes a contour of said seat cushion; and
 a wire sub-assembly formed in said wire frame assembly and disposed in said foam padding at a point adjacent to said space; and
 a substantially rigid protection plate including a pair of lateral walls projecting down from said protective plate and a plurality of securing pieces projected horizontally and outwardly from a free edge of each of said pair of lateral walls;

wherein said plurality of securing pieces are securely connected with said wire sub-assembly in said space, and each has a width less than that of said protection plate so that said plurality of securing pieces will bend with respect to the protection plate given a great force against said protection plate; and wherein a bottom surface of said protection plate abuts and is fixed to a top surface of said body portion of said cup support element so as to embracingly cover said body portion, while being supportively connected with said wire frame via said plurality of securing pieces.

15. The structure according to claim 14, wherein said seat cushion has an upper side on which a passenger is to sit; a lateral side vertically extending from said upper side; and a bottom side opposite to said upper side; wherein said foam padding has an upper wall corresponding to said upper side of said seat cushion; a lateral wall corresponding to said lateral side of said seat cushion; and a bottom wall corresponding to said bottom side of said seat cushion, and wherein said space if formed by cutting away part of said lateral and bottom walls of said foam padding.

16. The structure according to claim 14, wherein said wire sub-assembly includes at least two wire members connected with said wire frame assembly, and wherein said plurality of securing pieces of said protection plate are securely connected with said at least two wire members.

* * * * *